May 20, 1930.                  P. C. DAY                    1,759,689
                                GEAR SET
                          Filed Aug. 6, 1927           2 Sheets-Sheet 1

INVENTOR.
Percy C. Day
BY
Ralph W. Brown.
ATTORNEY.

May 20, 1930. P. C. DAY 1,759,689
GEAR SET
Filed Aug. 6, 1927 2 Sheets-Sheet 2

INVENTOR.
PERCY C. DAY
BY
ATTORNEY.

Patented May 20, 1930

1,759,689

UNITED STATES PATENT OFFICE

PERCY C. DAY, OF MILWAUKEE, WISCONSIN, ASSIGNOR TO THE FALK CORPORATION, OF MILWAUKEE, WISCONSIN, A CORPORATION OF WISCONSIN

GEAR SET

Application filed August 6, 1927. Serial No. 211,064.

This invention relates to heavy duty gear sets for converting rotary motion at relatively high speed and low torque into rotary motion at relatively low speed and high torque or vice versa.

The general aim of the present invention is the provision of a gear set for the purposes named of improved economical design. This I have accomplished by the use of separate gear trains so constructed and combined with the driving and driven parts that each carries a predetermined fractional part of the entire transmitted load. The marked reduction in the size and weight of the component parts of each gear train, made possible by this fractional transmission of the load, results in a material reduction in the total cost of the entire set.

Attempts heretofore made to use separate gear trains for carrying fractional parts of the load have not proven entirely successful due to an inability to effect a proper distribution of the load in a satisfactory manner. This problem of proper distribution is rendered difficult by reason of the positive nature of each gear train and the inherent back lash and minute inequalities therein which cause one train to assume, at least momentarily, the entire load to the exclusion of the other. The introduction of a resilient medium in an effort to equalize the load upon the separate gear trains only leads to further difficulties. A more specific object of the present invention is the provision in a gear set of the character mentioned of a novel combination and arrangement of parts by which each of the separate gear trains will at all times carry its allotted portion of the load without destroying the positive nature of the drive.

Other objects and advantages will appear from the following description of an illustrative embodiment of the present invention.

In the drawings:—

Figure 1:
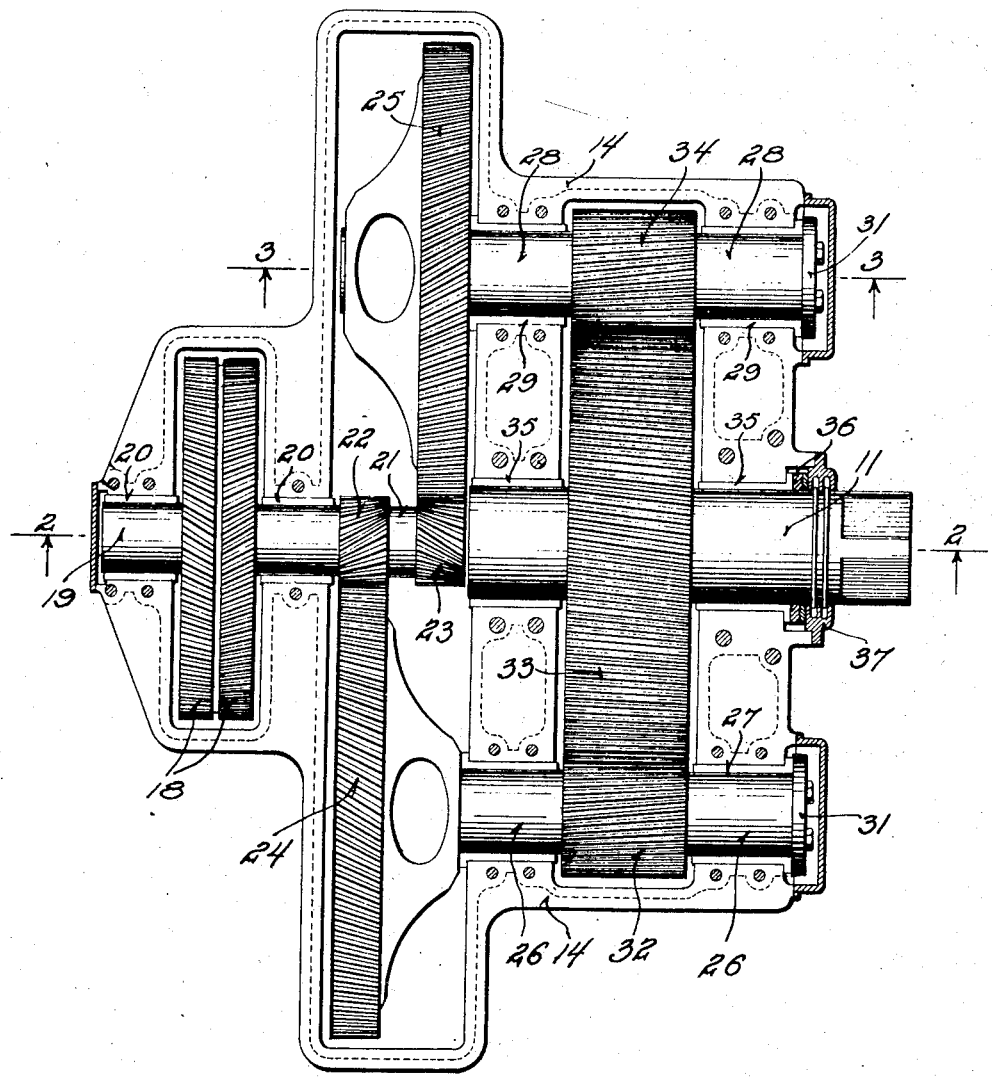
Figure 1 is a plan view of a gear set constructed in accordance with the present invention, with the top half of the gear casing removed.
Figure 2:
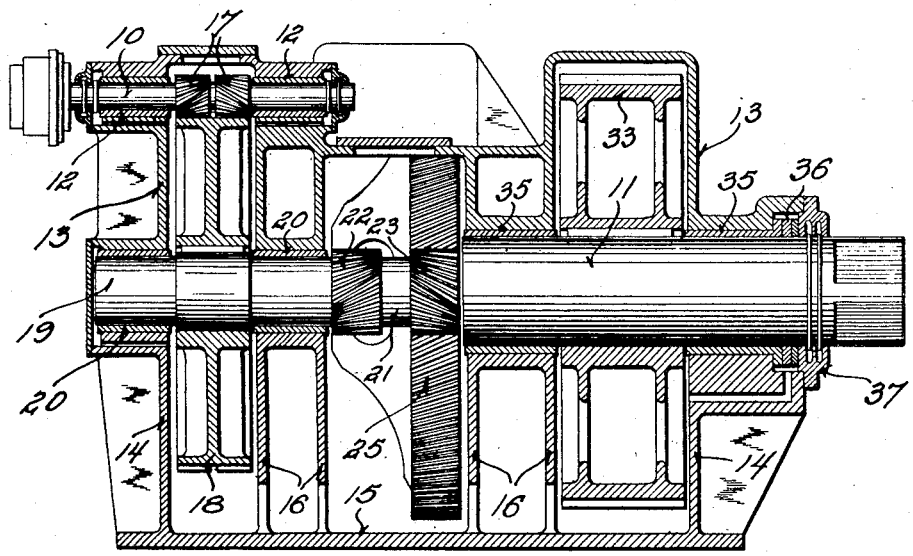
Fig. 2 is a vertical sectional view on the line 2—2 of Figure 1.

The gear set selected for illustration provides for a triple reduction in speed between the drive shaft 10 and driven shaft 11. The drive shaft 10 in this instance is journaled in appropriate spaced bearings 12 formed in the upper half 13 of a horizontally split casing whose lower portion 14 is formed with an appropriate base 15 and with appropriate rigid supports 16 for the bearings of the several shafts. A herring-bone pinion 17, disposed between the bearings 12, is formed integral with the drive shaft and meshes with a herring-bone gear 18, keyed or otherwise fixed to a shaft 19, journaled in spaced bearings 20. Shaft 10 is mounted for limited end play within the bearings 12, in order to permit the pinion 17 to adjust itself to the gear 18, and shaft 19 is mounted for limited end play within the bearings 20 for a purpose which will hereinafter appear.

Figure 3:
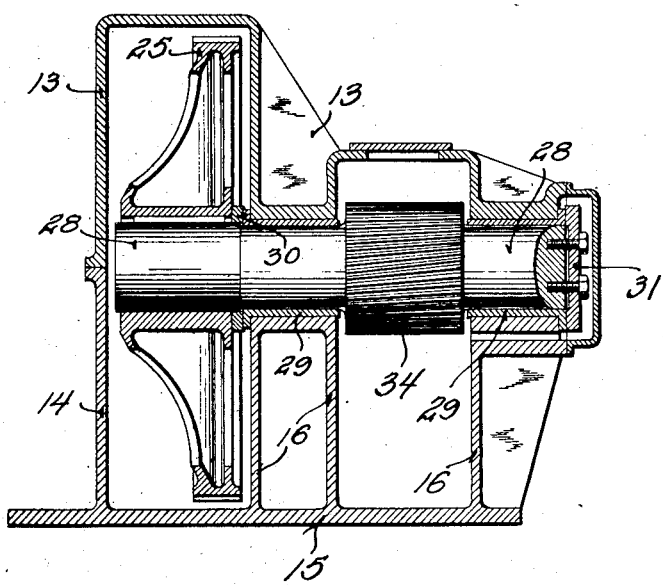
Fig. 3 is a vertical sectional view on the line 3—3 of Figure 1.

One end 21 of the shaft 19 projects beyond the bearings 20 and carries two single helical pinions 22 and 23 the spiral angle of each being equal to but the reverse of the other. Two single helical gears 24 and 25, disposed at opposite sides of the shaft 19, mesh with pinions 22 and 23, respectively. Gear 24 is keyed or otherwise fixed to the end of a shaft 26, journaled in a pair of spaced bearings 27, and gear 25 is fixed to a similar shaft 28, journaled in spaced bearings 29. Each shaft 26 and 28 is firmly secured against end play by appropriate means such as an end thrust ring 30, anchored on the shaft and coacting with the end of one bearing to retain the shaft against movement toward the right, and a take-up plate 31 clamped upon the end of the shaft and coacting with the end of the other bearing to retain the shaft against movement toward the left. (See Fig. 3.) A single helical pinion 32 formed on shaft 26, intermediate the bearings 27, meshes with a single helical gear 33, keyed or otherwise fixed to the driven shaft 11, and a similar pinion 34 on shaft 28 also meshes with gear 33 at the opposite side thereof. Shaft 11 is journaled in a pair of spaced bearings 35 and is retained against end play by appropriate means such as an end thrust ring 36 fixed to the shaft and confined between the end of one bearing 35 and a collar 37 removably fixed to the casing and surrounding the shaft 11.

It will be noted that, by virtue of the reverse spiral angle on the two pinions 22 and 23, the tooth pressure between the pinion 22 and gear 24 will tend to shift the shaft 19 lengthwise in one direction and the tooth pressure between the pinion 23 and gear 25 will tend to shift the shaft 19 in the opposite direction. Since this shaft is freely shiftable in its bearings 20 it will always assume a position in which the end thrusts produced by these reactions are balanced, so that the tooth pressures between pinion 22 and gear 24 and between pinion 23 and gear 25 are always equal and the load transmitted through the shaft 19 is equally divided between the two gear trains 22, 24, 32 and 33, and 23, 25, 34 and 33, respectively. It will also be noted that since the tooth pressures between pinion 22 and gear 24 and between pinion 23 and gear 25 are equal but in opposite directions the transverse thrusts upon the end 21 of the shaft 19 is balanced, and there is therefore no need of a third bearing to support the projecting end of this shaft. It will be further noted that the tooth pressures on the pinion 34 are much greater than the tooth pressures on the gear 25 because of the difference in distance of these teeth from the axis of the shaft 28, so that the tooth pressure upon the pinion 34 is sufficient at all times to retain the shaft 28 against tilting in its bearings 28 under the influence of the transverse thrust of the gear 25 thereon. Due to this peculiar reaction it has been found unnecessary to provide a third bearing for the projected end of the shaft 28. The same is true of shaft 26. This elimination of a third bearing for shafts 19, 26 and 28 means a marked reduction in the cost of the gear set.

Various changes may be made in the embodiment of the invention hereinabove specifically described without departing from or sacrificing the advantages of the invention as defined in the appended claim.

I claim:—

In a gear set the combination of a shaft, a pinion thereon, a second shaft, a pair of spaced bearings therefor permitting free axial movement thereof, a gear on said second shaft between said bearings and meshing with said pinion, a pair of single helical pinions on said second shaft beyond said bearings, a third shaft coaxial with said second shaft, a gear on said third shaft, a pair of shafts, a pair of spaced bearings for each of said pair of shafts, a pinion on each of said pair of shafts between the bearings thereof and meshing with said last named gear, means for holding said pair of shafts against end movement, and a single helical gear on each of said pair of shafts beyond the bearings thereof and meshing with one of said single helical gears, said single helical gears being axially movable with said second shaft and coacting with said single helical gears to equalize the load thereon.

In witness whereof, I hereunto subscribe my name this 2nd day of August, 1927.

PERCY C. DAY.